United States Patent
Barton et al.

(10) Patent No.: US 11,995,034 B2
(45) Date of Patent: *May 28, 2024

(54) HIERARCHICAL TAGS WITH COMMUNITY-BASED RATINGS

(71) Applicant: TiVo Solutions Inc., San Jose, CA (US)

(72) Inventors: James M. Barton, Alviso, CA (US);
Brian Beach, Columbus, IN (US);
David Platt, Mountain View, CA (US);
Kevin Smith, Mountain View, CA (US); Michael Klar, Santa Clara, CA (US); Paul Stevens, Felton, CA (US);
David Chamberlin, Pacific, CA (US);
Richard Lee, San Francisco, CA (US)

(73) Assignee: TiVo Solutions Inc., San Jose, CA (US)

( * ) Notice: Subject to any disclaimer, the term of this patent is extended or adjusted under 35 U.S.C. 154(b) by 1231 days.

This patent is subject to a terminal disclaimer.

(21) Appl. No.: 16/653,477

(22) Filed: Oct. 15, 2019

(65) Prior Publication Data
US 2020/0057751 A1 Feb. 20, 2020

Related U.S. Application Data

(63) Continuation of application No. 15/243,777, filed on Aug. 22, 2016, now Pat. No. 10,489,347, which is a
(Continued)

(51) Int. Cl.
*G06F 16/78* (2019.01)
*G06F 16/13* (2019.01)
(Continued)

(52) U.S. Cl.
CPC ........ *G06F 16/13* (2019.01); *G06F 16/24573* (2019.01); *G06F 16/282* (2019.01);
(Continued)

(58) Field of Classification Search
CPC .. G06F 16/13; G06F 16/24573; G06F 16/282; G06F 16/48; G06F 16/71; G06F 16/735; G06F 16/78; G06F 16/7867
See application file for complete search history.

(56) References Cited

U.S. PATENT DOCUMENTS

| 5,532,948 A | 7/1996 | Kohno et al. |
| 5,640,553 A | 6/1997 | Schultz |

(Continued)

FOREIGN PATENT DOCUMENTS

| CN | 1474598 A | 2/2004 |
| CN | 1513266 A | 7/2004 |

(Continued)

*Primary Examiner* — Robert W Beausoliel, Jr.
*Assistant Examiner* — Nirav K Khakhar
(74) *Attorney, Agent, or Firm* — Haley Guiliano LLP

(57) ABSTRACT

A method for generating and maintaining hierarchical tags with community-based ratings is provided. Tags for media streams are organized into a hierarchical format. Users may select tags from the hierarchical tag database that describes a particular multimedia content. If the user is unable to locate a desired tag, the user may submit a new tag. Upon submission of the new tag, a librarian approves the tag before storing and placing the tag in the hierarchical tag database. Users are also able to rate the quality of the association between the tag and the multimedia content. If a tag is rated low, the tag may be removed from the hierarchical tag database. If the tag is rated highly, display of the tag in a list of tags becomes more prominent.

20 Claims, 8 Drawing Sheets

Related U.S. Application Data continuation of application No. 14/531,899, filed on Nov. 3, 2014, now Pat. No. 9,424,264, which is a continuation of application No. 12/433,647, filed on Apr. 30, 2009, now Pat. No. 8,880,529, which is a continuation-in-part of application No. 12/121,619, filed on May 15, 2008, now Pat. No. 10,313,760.

(60) Provisional application No. 60/930,419, filed on May 15, 2007.

(51) Int. Cl.
*G06F 16/2457* (2019.01)
*G06F 16/28* (2019.01)
*G06F 16/48* (2019.01)
*G06F 16/71* (2019.01)
*G06F 16/735* (2019.01)

(52) U.S. Cl.
CPC .............. *G06F 16/48* (2019.01); *G06F 16/71* (2019.01); *G06F 16/735* (2019.01); *G06F 16/78* (2019.01); *G06F 16/7867* (2019.01)

(56) References Cited

U.S. PATENT DOCUMENTS

| | | |
|---|---|---|
| 5,801,787 A | 9/1998 | Schein et al. |
| 5,872,588 A | 2/1999 | Aras et al. |
| 6,005,565 A | 12/1999 | Legall et al. |
| 6,681,395 B1 | 1/2004 | Nishi |
| 7,177,589 B1 | 2/2007 | Lynch |
| 7,296,032 B1 | 11/2007 | Beddow |
| 7,324,961 B2 | 1/2008 | Al-Azzawe |
| 7,747,132 B2 | 6/2010 | Poslinski |
| 7,890,490 B1 | 2/2011 | Bovenschulte et al. |
| 7,898,394 B2 | 3/2011 | Hibbets |
| 8,301,648 B2 | 10/2012 | Poniatowski et al. |
| 8,464,295 B2 | 6/2013 | Stallings et al. |
| 8,528,019 B1 | 9/2013 | Dimitrova et al. |
| 8,880,529 B2 | 11/2014 | Klar et al. |
| 8,914,394 B1 | 12/2014 | Dubois et al. |
| 8,959,099 B2 | 2/2015 | Poniatowski et al. |
| 9,288,548 B1 | 3/2016 | Dubois et al. |
| 9,424,264 B2 | 8/2016 | Barton et al. |
| 2002/0009285 A1 | 1/2002 | Safadi et al. |
| 2002/0042921 A1 | 4/2002 | Ellis |
| 2002/0083153 A1 | 6/2002 | Sweatt et al. |
| 2002/0143525 A1 | 10/2002 | Lewis |
| 2002/0169656 A1 | 11/2002 | Al-Azzawe |
| 2003/0014753 A1 | 1/2003 | Beach et al. |
| 2003/0028896 A1 | 2/2003 | Swart et al. |
| 2003/0066093 A1 | 4/2003 | Cruz-Rivera et al. |
| 2003/0067554 A1 | 4/2003 | Klarfeld et al. |
| 2003/0151621 A1 | 8/2003 | McEvilly et al. |
| 2003/0196164 A1 | 10/2003 | Gupta et al. |
| 2003/0226147 A1 | 12/2003 | Richmond et al. |
| 2004/0013409 A1 | 1/2004 | Beach et al. |
| 2004/0021685 A1 | 2/2004 | Denoue et al. |
| 2004/0024739 A1 | 2/2004 | Copperman et al. |
| 2004/0024886 A1 | 2/2004 | Saxena |
| 2004/0078816 A1 | 4/2004 | Johnson |
| 2004/0096184 A1 | 5/2004 | Poslinski |
| 2004/0128317 A1 | 7/2004 | Sull et al. |
| 2004/0158856 A1 | 8/2004 | Grooters et al. |
| 2004/0187164 A1 | 9/2004 | Kandasamy et al. |
| 2004/0194141 A1 | 9/2004 | Sanders |
| 2004/0194741 A1 | 10/2004 | Sun et al. |
| 2004/0221310 A1 | 11/2004 | Herrington et al. |
| 2004/0260702 A1 | 12/2004 | Cragun et al. |
| 2005/0131866 A1 | 6/2005 | Badros et al. |
| 2005/0182792 A1 | 8/2005 | Israel et al. |
| 2005/0204385 A1 | 9/2005 | Sull et al. |
| 2005/0234958 A1 | 10/2005 | Sipusic et al. |
| 2005/0240963 A1 | 10/2005 | Preisman et al. |
| 2006/0015580 A1 | 1/2006 | Gabriel et al. |
| 2006/0015925 A1 | 1/2006 | Logan |
| 2006/0041910 A1 | 2/2006 | Hatanaka et al. |
| 2006/0101504 A1 | 5/2006 | Aravamudan et al. |
| 2006/0117351 A1 | 6/2006 | Sanders et al. |
| 2006/0146436 A1 | 7/2006 | Goodwin et al. |
| 2006/0167876 A1 | 7/2006 | Benitez et al. |
| 2006/0167903 A1 | 7/2006 | Smith et al. |
| 2006/0168231 A1 | 7/2006 | Diperna |
| 2006/0184983 A1 | 8/2006 | Casey |
| 2006/0242554 A1 | 10/2006 | Gerace et al. |
| 2006/0271519 A1 | 11/2006 | Blackwood et al. |
| 2007/0078832 A1 | 4/2007 | Ott et al. |
| 2007/0100799 A1 | 5/2007 | Rose et al. |
| 2007/0156844 A1 | 7/2007 | Lee |
| 2007/0174471 A1 | 7/2007 | Van |
| 2007/0199038 A1 | 8/2007 | Choi |
| 2007/0204299 A1 | 8/2007 | Vosseller |
| 2007/0209049 A1 | 9/2007 | Kelly et al. |
| 2007/0212025 A1 | 9/2007 | Barton et al. |
| 2007/0214488 A1 | 9/2007 | Nguyen et al. |
| 2007/0219856 A1 | 9/2007 | Ahmad-Taylor |
| 2007/0223870 A1 | 9/2007 | Farling et al. |
| 2007/0239335 A1 | 10/2007 | Tanaka et al. |
| 2007/0248055 A1 | 10/2007 | Jain et al. |
| 2008/0005107 A1 | 1/2008 | Funaki |
| 2008/0066099 A1 | 3/2008 | Brodersen et al. |
| 2008/0092168 A1 | 4/2008 | Logan et al. |
| 2008/0103996 A1 | 5/2008 | Forman et al. |
| 2008/0113658 A1 | 5/2008 | Bloebaum et al. |
| 2008/0115168 A1 | 5/2008 | Adwankar et al. |
| 2008/0134866 A1 | 6/2008 | Brown |
| 2008/0148322 A1 | 6/2008 | Howcroft |
| 2008/0168503 A1 | 7/2008 | Sparrell |
| 2008/0172362 A1 | 7/2008 | Shacham et al. |
| 2008/0215366 A1 | 9/2008 | Robson et al. |
| 2008/0228749 A1 | 9/2008 | Brown |
| 2008/0249991 A1 | 10/2008 | Valz |
| 2008/0288460 A1 | 11/2008 | Poniatowski et al. |
| 2008/0288461 A1 | 11/2008 | Glennon et al. |
| 2008/0313272 A1 | 12/2008 | Nguyen et al. |
| 2009/0094520 A1 | 4/2009 | Kulas |
| 2009/0240692 A1 | 9/2009 | Barton et al. |
| 2009/0300683 A1 | 12/2009 | Rynkowski |
| 2009/0324195 A1 | 12/2009 | Poslinski |
| 2010/0186038 A1 | 7/2010 | Thomas et al. |
| 2010/0232656 A1 | 9/2010 | Ryu |
| 2010/0251162 A1 | 9/2010 | Stallings et al. |
| 2011/0296456 A1 | 12/2011 | Pandala |
| 2013/0111527 A1 | 5/2013 | Poniatowski et al. |
| 2013/0347040 A1 | 12/2013 | Baxter |
| 2015/0058379 A1 | 2/2015 | Barton et al. |
| 2015/0131974 A1 | 5/2015 | Poniatowski et al. |
| 2016/0198231 A1 | 7/2016 | Dubois et al. |

FOREIGN PATENT DOCUMENTS

| | | |
|---|---|---|
| CN | 1529504 A | 9/2004 |
| CN | 101039407 A | 9/2007 |
| JP | H11275462 A | 10/1999 |
| JP | 2001028007 A | 1/2001 |
| JP | 2001243240 A | 9/2001 |
| JP | 2002344868 A | 11/2002 |
| JP | 2003044484 A | 2/2003 |
| JP | 2003087677 A | 3/2003 |
| JP | 2004023118 A | 1/2004 |
| JP | 2004134847 A | 4/2004 |
| JP | 2004193871 A | 7/2004 |
| JP | 2004524163 A | 8/2004 |
| JP | 2005122322 A | 5/2005 |
| JP | 2005175850 A | 6/2005 |
| JP | 2006019998 A | 1/2006 |
| JP | 2006157247 A | 6/2006 |
| JP | 2006309364 A | 11/2006 |
| WO | 0137465 A2 | 5/2001 |
| WO | 0146843 A2 | 6/2001 |
| WO | 02069629 A2 | 9/2002 |
| WO | 0180079 A3 | 12/2003 |

(56) References Cited

FOREIGN PATENT DOCUMENTS

| | | |
|---|---|---|
| WO | 2005101411 A2 | 10/2005 |
| WO | 2005112452 A1 | 11/2005 |
| WO | 2006098031 A1 | 9/2006 |

FIG. 3

Tag Submission for "24"

Comedy 300
Drama 302
Suspense 304
Action Adventure 306
Tragedy 308

Press ⊙ to start a new submission

FIG. 4

Swivel Search
400

Search for any word or phrase in program titles, people, or tags. Tags are keywords that are attached to the most popular programs. Swivel Search finds both broadcast programming and downloads.

Use the arrows to move around the letter grid and press SELECT on the first few letters of your search term.

Then press RIGHT arrow to choose an item in the list.

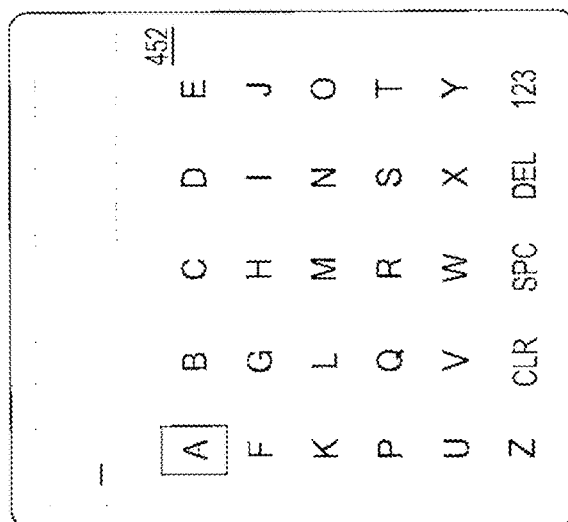

452

| A | B | C | D | E |
|---|---|---|---|---|
| F | G | H | I | J |
| K | L | M | N | O |
| P | Q | R | S | T |
| U | V | W | X | Y |
| Z | CLR | SPC | DEL | 123 |

Press ENTER for more options

HIERARCHICAL TAGS WITH COMMUNITY-BASED RATINGS

CROSS-REFERENCE TO RELATED APPLICATIONS; PRIORITY CLAIM

This application claims benefit under 35 U.S.C. § 120 as a Continuation of U.S. application Ser. No. 15/243,777, filed Aug. 22, 2016 (currently allowed), which claims benefit as a Continuation of U.S. application Ser. No. 14/531,899, filed Nov. 3, 2014, now U.S. Pat. No. 9,424,264; which claims benefit as a Continuation of U.S. application Ser. No. 12/433,647, filed Apr. 30, 2009, now U.S. Pat. No. 8,880,529; which claims benefit as a continuation-in-part to U.S. application Ser. No. 12/121,619, filed May 15, 2008, now U.S. Pat. No. 10,313,760, which claims benefit under 35 U.S.C. § 119(e) to U.S. Provisional Application 60/930,419, filed May 15, 2007, the entire contents of each are hereby incorporated by reference for all purposes as if fully set forth herein. The applicant hereby rescinds any disclaimer of claim scope in the parent application(s) or the prosecution history thereof and advise the USPTO that the claims in this application may be broader than any claim in the parent application(s).

FIELD OF THE INVENTION

The present invention relates to managing and processing tags.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

TV viewers may record broadcast TV programs using a videocassette recorder (VCR). A VCR user is able to record a particular TV program at the time the particular TV program is broadcast and play back the same recorded TV program at a later time. A VCR records a TV program by changing the electrical signals representing a TV program into magnetic signals and storing the magnetic signals on a magnetic tape. The magnetic tape is usually in the form of a videocassette tape inserted into the VCR by the VCR user. When a VCR user decides to play back the TV program, the process is reversed, and the VCR changes the magnetic signals stored on the videocassette tape into electrical signals and sends the electrical signals to a TV set for display.

With the development of digital technology, VCRs are being replaced by digital video recorders (DVRs). A DVR records broadcast TV programs for later playback by changing electrical signals of the TV program into digital information and storing the digital information on a storage device. When a user plays back the recorded TV program, the DVR converts the digital information back to analog signals and sends the signals to the TV set which displays the TV program for the viewer. In addition, with the advent of digital TVs, the DVR is able to receive digital and analog signals and send digital signals directly to a digital TV set that displays the TV program in digital form. Many content providers now use digital cable and satellite technology to broadcast digital programming. The digital programming is received by cable boxes and/or satellite transceivers that are used to display the digital programming to a user on a display screen. DVRs thus have the ability to receive digital programming signals from cable boxes or satellite transceivers for recording and display as well as being incorporated into such devices.

If the DVR is successfully connected to a network, then the DVR is also able to store and display content that has been downloaded from the network. For example, video content might be downloaded from the Internet from a variety of sources, such as C|Net or nytimes.com. After a user has instructed the DVR to download particular content, the DVR requests the download and once downloaded, stores the content for later viewing by a user.

DVRs have become increasingly popular and widely used for storing and displaying all types of multimedia content. As the amount of content available has increased, being able to search for and find desirable content has become increasingly important. Categorizing and labeling content for users and maintaining that information to ensure accuracy helps in improving those searches. Thus, mechanisms that improve the management of labeling for multimedia content has become increasingly important.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is an illustration of a two-column graphical user interface that may be used with tag submission, according to an embodiment;

FIG. 4 is an illustration of a search screen with a soft keyboard, according to an embodiment;

DETAILED DESCRIPTION

Figure 1:
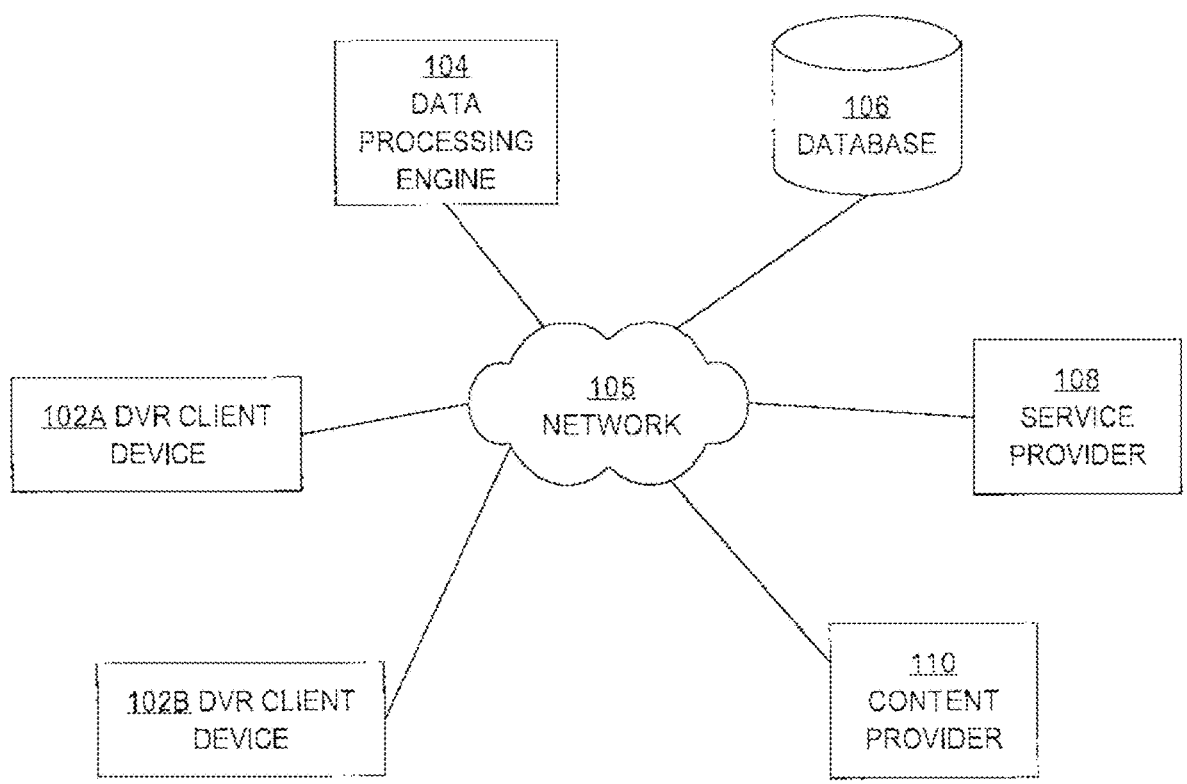
FIG. 1 is a block diagram illustrating a system for creating and processing hierarchical tags and community-based ratings data according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
  2.0 Structural Overview
  3.0 Methods for Hierarchical Tags with Community Based Ratings
    3.1 Tags
    3.2 Processing Tags
    3.3 Community-Based Ratings 3.4 Illustrations of Tags and Community-Based Ratings
4.0 Example Embodiments
5.0 Implementation Mechanisms

1.0 GENERAL OVERVIEW

The needs identified in the foregoing Background, and other needs and objects that will become apparent from the following description, are achieved in the present invention, which comprises methods to manage hierarchical tags with community based ratings.

Tags, as used herein, are used to describe or label particular multimedia content. The label might be applied to an individual television episode or to an entire television series. The granularity of tags, or the section of the multimedia content to which the tag applies, may vary from implementation to implementation. For example, the television series "24" might be tagged with the labels "espionage" or "suspense" to indicate the subject matter and genre of the series. Within the series, individual episodes might have their own labels to indicate a particular occurrence within the episode. For example, an episode in the series "24" might be labeled "kidnapped" to indicate that a kidnapping occurs in the episode. Tags may also be used to indicate a particular segment of a multimedia content and may contain descriptions associated with the particular segment. Within an episode of "24", a tag might indicate "gunfire" at the particular segment in the episode when a shoot out occurs. In an embodiment, the particular segment may refer to a duration within the multimedia content or a single point in time in the multimedia content. For example, the tag for "gunfire" might refer to a segment that lasts a total of 2:00 minutes, the duration of the gunfight scene. In another example, another tag might indicate an end to credits or other single point in the multimedia content.

Tags may be used with any type of device that is capable of displaying video. These devices include, but are not limited to, portable devices, DVD players, and other devices able to display video in any type of format. Some examples of video formats include, but are not limited to MPEG-2, MPEG-4, NTSC, and ATSC. Portable devices might include, are not limited to, portable DVD players, PDAs, smartphones, and any other portable device capable of displaying video.

Tags may originate from a variety of sources. Content providers, third party editors, service providers, or users themselves are examples or sources that may insert tags to describe or label a particular multimedia content. Content providers may wish to control their content completely by including tags that the content provider wishes the viewer to see. Third party editors may wish to add tags as a service and charge service providers for the additional information that is added to the multimedia content. Third party editors generally provide a level of editorial quality and impartiality so that the quality of tags may be maintained across all multimedia content. Service providers may also include tags with multimedia content to help viewers find specific programs or to add advertisements to media streams.

Tags that originate from the user community present the most possibilities for adding tags to content quickly and with a wide variety of points-of-view. Large segments of users may wish to add tags to a particular multimedia content. However, a variety of problems may occur. For example, tags might not accurately reflect the multimedia content. This might occur because a user may wish to insert a tag to a multimedia content but inadvertently apply the tag to the incorrect multimedia content. In another example, tags submitted might be deemed inappropriate or offensive to other viewers. However, allowing users to tag media content themselves presents information to other users may be greatly valued.

In community-based tagging systems, users are encouraged to freely submit labels for a particular multimedia content that may describe or label the particular multimedia content. Tags may be used to describe the particular multimedia content as a whole or may be used to mark a specific part of the particular media stream, depending upon the granularity sought. For example, a label might be submitted for the movie "Star Wars" labeled "bar" for a particular scene that takes place in an intergalactic bar. In another example, a label might be submitted for a football game labeled "touchdown" to mark the time in the broadcast where a play resulting in a touchdown is run. In an embodiment, the user is able to select whether the tag submitted is to be applied to the whole multimedia content or just a portion of the multimedia content.

There may be a dictionary of tags from which users select from stored tags or free form tags, where users write out and submit all tags. In free form tags, users are required to type in the exact label of the tag that the users wish to apply to a particular section of the media content. Thus, when a user wants to enter any tag to a show, the user must type out the tag each time a tag is submitted. This presents many problems. One problem with requiring users to type in a label each time is that this might lead to tag misspellings that leads to minor variations on the same tag causing confusion and possible errors when analyzing the tags submitted. For example, for the show "24," users might submit tags to indicate that a gunfight occurs. Users might submit many similar tags to indicate the same action. "Guns", "gunfire," "gunfight," and "shooting" might all be submitted for the same gunfight scene. In addition, users may misspell their submissions. "Gunfit," "gunfigt," "and "gunfite" might all be submitted when the user intended to add the tag "gunfight." Each one of these entries may lead to separate tag entries.

In addition, typing in tags each time may lead to tags that some users may deem to be offensive. By not closely monitoring editorial content, as may occur with community-based tagging, tags that some users feel are offensive may be applied to multimedia content. One other drawback of this scheme is that there is an increased barrier to submitting tags because typing in tags may be cumbersome with on-screen keyboards for TV applications of media devices. For example, many media devices do not come equipped with a physical keyboard and instead users must use an on-screen keyboard, or soft keyboard, that is controlled by a remote input device. Each of the letters is located on the screen of the display device and users select each letter to input the tag.

Community-based tagging systems may be hierarchical or be a flat system. Hierarchical tags allow the system to suggest closely related content to a tag. For example, if a tag is searched, such as "slapstick," and very little results are returned, then a hierarchical system might suggest other closely related tags. Other tags, such as "satire" or "irony" might also be suggested since these are other categories of comedy, of which "slapstick" is a part. Thus, hierarchical tags also may allow a user to find media content that the user wishes. A flat system would not be able to offer any guidance to the user.

2.0 STRUCTURAL OVERVIEW

Referring to FIG. 1, in accordance with one embodiment, a system for maintaining hierarchical tags with community based ratings is shown. The system contains DVRs 102A and 102B, which are each communicatively coupled to Network 105 through any proper communication interface, such as an Ethernet or wireless communications port.

Further, the system also includes Data Processing Engine 104, Database 106, Service Provider 108 and Content Provider 110. The components of system 100 communicate through Network 105.

Network 105 may be implemented by any medium or mechanism that provides for the exchange of data between devices in the communication system. Examples of Network 105 include, without limitation, a network such as a Local Area Network (LAN), Wide Area Network (WAN), Ethernet or the Internet, or one or more terrestrial, satellite or wireless links. Alternatively, or in addition, any number of devices connected to Network 105 may also be directly connected to each other through a communications link.

In one embodiment, DVRs 102A and 102B communicate with Service Provider 108, which provides program guide data, graphical resources (such as fonts and pictures), service information, software, advertisements, tags, and other forms of data that enable DVRs 102A, 102B to operate independently of Service Provider 108 to satisfy viewer interests. Additionally, Service Provider 108 may provide DVRs 102A and 102B with tags for video programs.

Content Provider 110 provides multimedia program content directly to DVRs 102A and 102B through over-the-air broadcasts, satellite transmissions, coaxial cable, or through the Network 105. The multimedia program content includes, but is not limited to, feature-length movies, sitcoms, variety shows, talk shows, or advertisements.

According to another embodiment, Content Provider 110 provides media synchronization data that may include metadata (that identifies programs, series, or segments and single points in a program), promotional data, icons, web data, and other information. The media synchronization data may be provided to Service Provider 108 for transfer to DVRs 102A and 102B. Service Provider 108 receives the tags and allows DVRs to receive and process the tags for use with an associated multimedia content. In another embodiment, Content Provider 110 provides tag data directly to DVRs 102A and 102B.

According to an embodiment, DVRs 102A and 102B, alone or in combination, are used to submit tags. The tags are supplied through Network 105 to Database 106, which collects and stores tags associated with various programs and multimedia content originating from multiple devices. Database 106 may be any form of data storage, such as a traditional database system. According to another embodiment, the tags created by Content Provider 110 and Service Provider 108 are stored by Database 106.

Data Processing Engine 104 retrieves tags from Database 106 and is responsible for examining the data to perform various functions. For example, the Data Processing Engine 104 analyzes selected tags from Database 106 in order to identify common characteristics within a plurality of the tags. By identifying the common characteristics of the tags, the Data Processing Engine 104 may identify distinct segments of a video program, including commercial breaks and other events that may be of interest to DVR users.

3.0 METHODS FOR HIERARCHICAL TAGS WITH COMMUNITY-BASED TAGGING

Providing users with a centrally managed but community maintained hierarchical tagging system would improve on limitations of only flat tagging structures (e.g. no offers of suggestions to the user). In an embodiment, a community of users is responsible for submitting tags to particular content and a service provider maintains a set of tag labels that may be applied to content in a hierarchical schema. Under this circumstance, the service provider maintains a database of tags from which a user may select a term. Maintaining a set of tags (tag dictionary) also removes the possibility of misspellings and minor variations of the same word. If a user wishes to submit a tag, then the user chooses a tag that is already present in the database of tags.

Figure 2:
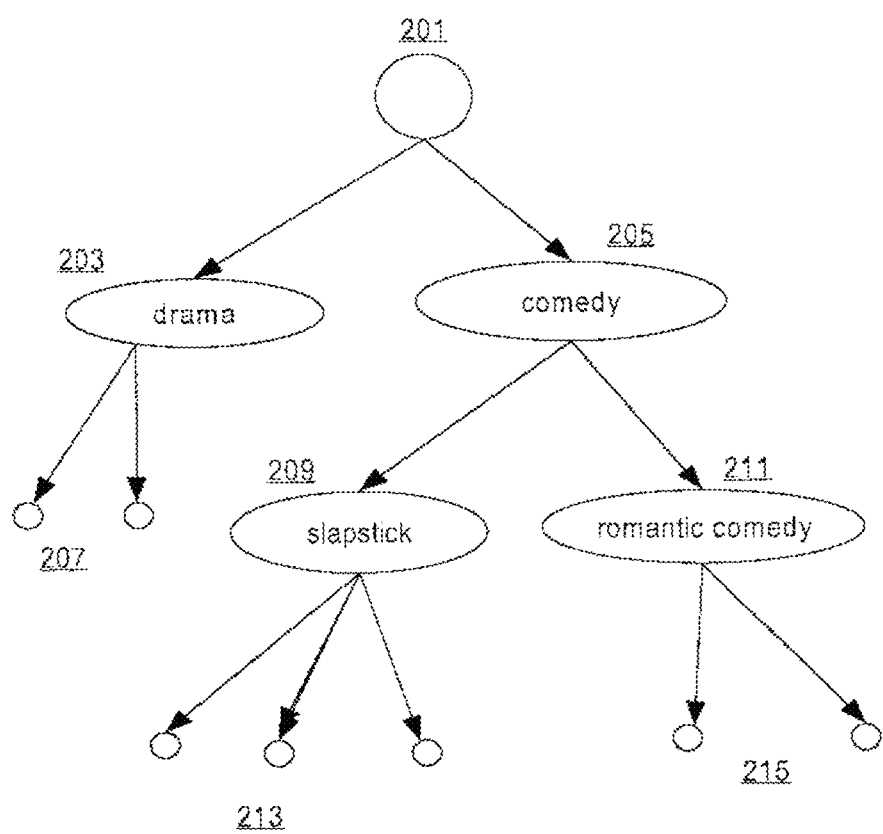
FIG. 2 is an illustration depicting a hierarchical tree structure comprising tags, according to an embodiment.

In an embodiment, a hierarchical structure may be described as a tree type structure comprising nodes, an illustration of which is included as FIG. 2. Each node may contain a value and has zero or more child nodes, which are below the current node in the tree. A node that has a child is called the child's parent node. Each node has at most one parent. The topmost node in a tree is called the root node 201 and has no parents. All other nodes may be reached from the root node by following links to a succeeding node. Nodes that do not have children are called leaf nodes. In another embodiment, the hierarchical structure refers to a tree data structure where nodes are not limited to a single parent. For example, the structure may be a directed acyclic graph, or DAG. Under this circumstance, a child node may have multiple parents and a sub-category might be under more than a single category (i.e., "romantic comedy" may be under the categories "romance" and "comedy").

3.1 TAGS

In an embodiment, the database of tags is maintained in a hierarchical system. With tags having a hierarchical structure, a more systematic approach may be applied to the selection of tags. More generic words are placed higher in the hierarchy, and the detail of the words increase as one goes down the hierarchy. This is shown in FIG. 2. For example, a hierarchy may have the general terms "drama" and "comedy" in nodes 203 and 205 near the top of the hierarchy. If a user selects "comedy", there are more detailed selections such as, but not limited to, "romantic comedy" 211, "slapstick" 209, and "dark humor" (not shown). Details and further selections are available as the user navigates further down into the hierarchy. For "drama" node 203, more detailed selections are represented by child nodes 207. For "slapstick" node 209, more detailed selections are represented by child nodes 213. For "romantic comedy" node 211, more detailed selections are represented by child nodes 215. The child nodes comprise more detailed labels. These child nodes may have more children, depending on the level of detail contained in the hierarchical structure.

3.2 PROCESSING TAGS

In an embodiment, if a user is unable to find a term that satisfies his intent, the user may submit a new tag. The user may also identify at least one parent node for placement of the tag in the hierarchy. In an embodiment, the service provider accepts tags as submitted by the users and makes no changes to the tags prior to including the tag in the tag database. In another embodiment, the service provider receives the tags as submitted and then makes a decision as whether to include the newly submitted tag in the tag database. The service provider may determine whether the newly submitted tag is a duplicate or misspelling of an existing tag. The service provider may also determine whether the submitted tag is mis-categorized or offensive. Mis-categorizations are difficult to determine if one is not familiar with the content that is being labeled. Under this circumstance, only blatant mis-categorizations may be removed. For example, a label of "blood and guts" may be removed if the term was submitted for a children's show that does not contain such content, such as "Dora the Explorer."

In an embodiment, the process of screening newly submitted terms for tags is automated or performed by persons. As used herein, a "librarian" is one who is given the task to edit newly submitted tags by approving the tags for inclusion in the database or removing the tag from use. Tag approval may take many forms. The librarian may only be tasked to find and remove obvious offensive words and leave all other tags for entry. The librarian may choose to approve a tag only for specific media content. Under this circumstance, any tag approved by the librarian may only be applied to other episodes of the multimedia content to which the tag submitted applies. Thus, if a tag is submitted for the television show "24", then the tag is only available for other episodes of "24" and not to any other multimedia content. The librarian may be a trained person, automated, or a hybrid. In an embodiment, a hybrid system is used where newly submitted tags are first approved after a review through an automated process. The automated process may only search for misspellings and offensive words. If the tag passes the automated process, a live person then checks the submitted tag for inclusion in the tag database. In an embodiment, if a newly submitted tag is approved by the service provider, the tag is added to the hierarchy of tags in the database and thus made available to the tagging community to freely use. The librarian may also determine whether the tag should be associated with multiple parent nodes. For example, the tag "space monsters" was submitted as a child of the parent node "science fiction." The librarian might determine that "space monsters" should also be a child node of the node "horror" and place the tag with the parent node "horror" as well.

Community tagging of media content may be performed through a number of mechanisms. In an embodiment, new tags are submitted by web page to be included in the hierarchical tag database. For example, a service provider might already allow users to submit a request for recording from the service provider's web site. In order to submit a recording request, the user navigates to the service provider's website, logs on to his account, and then submits the recording request. In an embodiment, a new function is introduced whereby the user is able to submit tags for media content from his web page account. The submissions via web site may be limited to new labels for tags to be included with the hierarchical database for tags. Alternatively, submissions may be made using tags only included in the hierarchical database for tags. In an embodiment, a user is shown tags that already exist and the user is able to make a selection from those tags. If the tag that the user wishes to use is not present, then the user may submit a request to have the new tag included in the database.

A user is not limited to only submitting tags for media content using the service provider's web site. In an embodiment, the user is able to search for particular media content based upon tags associated with the multimedia content. For example, a search for any multimedia content that contains the tag "espionage" might return, among other things, "24", and "James Bond" movies. In another embodiment, the search may locate segments or points within media content. For example, a user might submit a search to locate a program with "49ers" with segments labeled "touchdown." This search would find "49ers" programs with segments where a touchdown occurs. Searching and viewing tags may provide the user more methods in which to search and find particular multimedia content and also, in the alternative, avoid media content that is associated with a particular tag.

In an embodiment, users may submit tag requests via mobile devices. Mobile devices comprise any device that is portable and includes, but is not limited to, mobile phone, smartphones, PDAs, tablet PCs, and laptop computers. Using any of these mobile devices, users may submit tags based on existing tags in the hierarchical database or add new tags for inclusion in the database. A user may also search the tags to find multimedia content for later viewing.

In an embodiment, potential new tags are submitted by users via the user's media device. The media device may be a DVR, personal computer, cable or satellite set top box, or any other device that is able to display or store multimedia content. With media devices, tagging may be integrated into an existing graphical user interface or a separate application may be developed.

In an embodiment, an application for tags comprises a user interface displaying two columns, wherein user selected tag categories are displayed on the left column, and possible sub-categories are displayed on the right column. An example of this is shown in FIG. 3. FIG. 3 shows an example of a two-column interface for a submission on the show "24." Two categories are shown on the left column, "comedy" 300 and "drama" 302. When a selection is highlighted, such as "drama" 302, then sub-categories of "drama" appear in the right column. This may be seen with "suspense" 304, "action-adventure" 306, and "tragedy" 308. When a user selects a subcategory from the right column, the selected subcategory moves to the left column, and new subcategories are listed on the right column. This process continues until the user has found the tag he wishes and submits, or until the subcategory column is exhausted. In an embodiment, to enable quickly jumping through the category list, any type of predictive typing process may be used. For example, T9 or iTap, which are predictive text processes for mobile phones, may be adapted for use with the media device.

In another embodiment, the tagging application user interface displays a soft keyboard on the left and a search ahead match list on the right. An example of such a screen with a soft keyboard, as integrated into Swivel Search (as described in U.S. application Ser. No. 12/121,619 and incorporated by reference herein), is shown in FIG. 4. In FIG. 4 is the search screen for Swivel Search 400. A soft keyboard 452 allows user to enter letters to spell search terms. Results appear on the right side of the screen and match the corresponding letters entered by the user.

Figure 5:
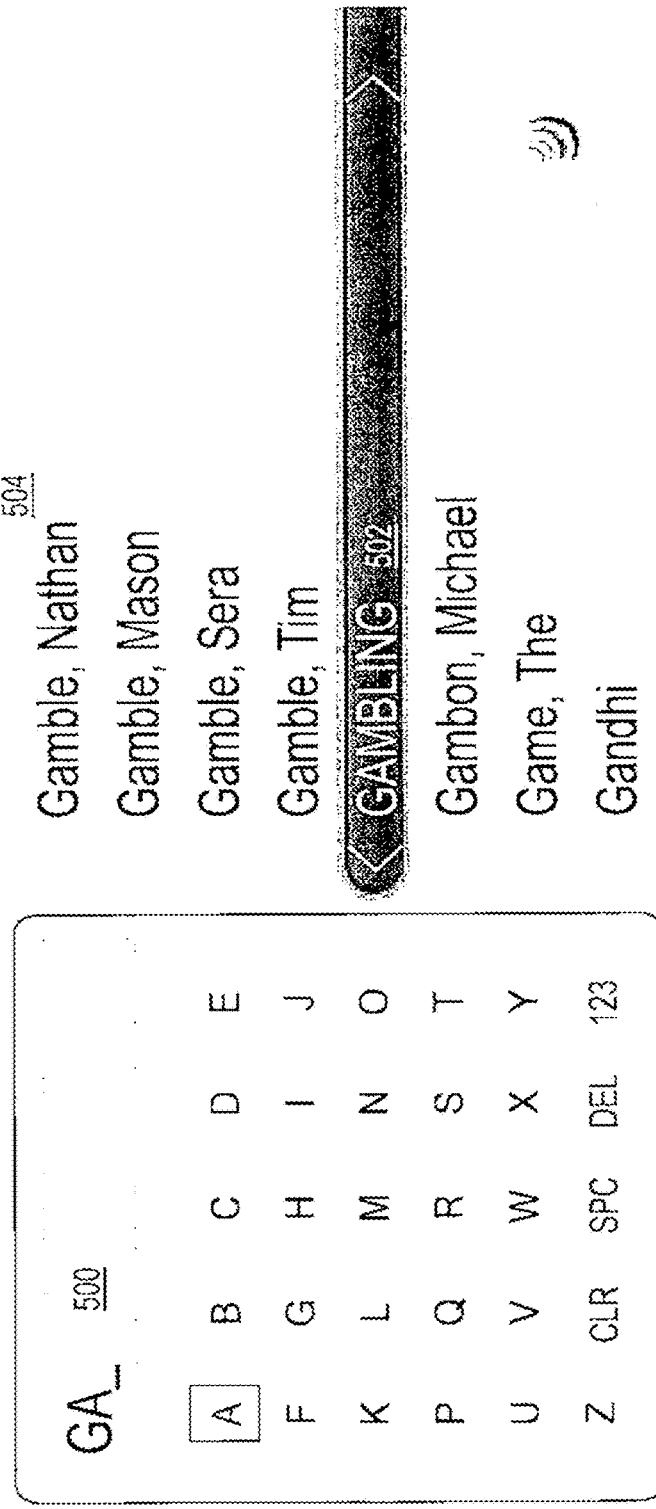
FIG. 5 is an illustration of a search screen with a soft keyboard after search letters have been entered by a user, according to an embodiment.

FIG. 5 displays the Swivel Search screen after a couple of letters are entered by a user. In this example, actors, multimedia content, and tags appear. In other embodiments, results may be limited to just tags. In FIG. 5, screen area 500 is where letters appear after a user begins submitting letters. The user has entered the letters "GA". Results 504 appear on the right side of the screen and match the corresponding letters. For example, the tag "gambling" 502 appears as the user has entered the letters "GA" that correspond to the first two letters of "gambling."

To inform the user of their location within the tag hierarchy, a tag path may appear at the top of the screen. A tag path is a sequence of where a node is contained in a hierarchy. For example, in the hierarchy shown in FIG. 2, the tag path to "romantic comedy" would be "/comedy/romantic comedy." Each path starts from the root node and traverses nodes until the current node is listed. In an embodiment, as the user finds categories and selects a tag, the tags are added to a tag path that may be displayed on the top of the screen until the user reaches a leaf tag.

Existing tag associations for a particular section of multimedia content may be viewed via existing applications or new applications. For example, an existing application, such as swivel search, may be modified to include tags and tag submissions. In another embodiment, a tag browsing application may be developed separately to provide functionality that may not be possible by using existing applications.

In order to help maintain tags, the user submitting a tag may be associated with the tag. In an embodiment, when a tag is associated with a piece of content, the identity of the first user to associate that tag is recorded along with the association. In another embodiment, when a tag is associated with a piece of content, the identity of any user to associate the tag is recorded along with the association. By including this information in the tag, especially adept users may be found by users searching for other tags by that submitting user. In addition, users who submit poor tags may be identified and not allowed future submission.

Privacy of the user associated with the tag must also be considered. Submitting users may not wish other users to view the submitting user's information and so request that his information is not shown. In an embodiment, the user identification is publicly visible to others. In another embodiment, the user identification is only used for internal bookkeeping purposes and not identifiable to others.

3.3 COMMUNITY-BASED RATINGS

In order to improve the quality of the tag associations, users may also be given the ability to rate the tag association. These ratings may then be used to place more highly rated tags higher in search list for tags or to remove poorly rated tags. In an embodiment, users rate a tag association using a remote device. For example, for DVRs, a user might rate tag associations using a thumbs up (indicating a good tag association) or thumbs down (indicating a bad tag association) button. In other embodiment, different types of rating terms may be used. The different types of rating systems may vary, and includes, but is not limited to, letter grades (A-F), numerical scores (1-5), or word grades ("bad", "good", "very good").

As an example of ratings, tags might be submitted and added for the television series "24." Users who view the tags rate the tag "espionage" very highly. In addition, the tag "comedy," has also been submitted for the series. Users might rate this tag association as very poor. Under this circumstance, when tags are shown for the series "24," the tag "espionage" would appear very high on the list and the tag "comedy" might appear at the bottom or be removed entirely from the list of tags.

The total number of ratings, along with a quality score, or net rating, may be recorded with the tag association in order to determine the quality of the tag. As used herein, a net rating may be defined as a single value that indicates ratings submitted regarding a particular tag. In an embodiment, a net rating is the total sum of the ratings where each thumbs up is (+1) and each thumbs down is (−1), divided by the total number of ratings. Any other calculation may be performed that indicates the overall ratings submitted for a particular tag. For example, the calculations may simply be the sum total of all tags where each thumbs up is (+1) and each thumbs down is (−1). Outlying ratings may be eliminated if the rating does not fit within a specified standard deviation.

A rating submitted by a user referencing a tag may also be weighted or non-weighted. In an embodiment, the rating on a particular tag may be weighted by the reliability of the user who submitted the rating. Under this circumstance, the reliability of the user is determined by other community ratings of that user's tags and a user of high reliability would be given more weight than a user of low reliability. The reliability of the user is given a value that is then calculated with the rating to provide a weighted rating. In an embodiment, in order to limit the ability of a particular user from skewing the ratings, users are allowed to rate a tag association only a specified number of times. For example, ratings for tag associations may be limited to only one per user per tag association. Limiting a rating to only one per user may be accomplished by recording a user identification of a user as the rating of the tag association is received. An administrator may then set the number of times each user may submit ratings per tag association. However, a user may be given the ability to change a rating that has been submitted.

Display of Tags to Viewers

In an embodiment, the display of tags associated with a particular multimedia content is based upon the ratings for the tags. In an embodiment, the following algorithm may be used: if there are many tag associations for a single price of multimedia content, only display the top N rated associations, where N=a specified number. This number may be 5 or 10, depending on the average number of ratings received for tags. In other embodiments, other algorithms that process ratings with tags may be used to affect the display and position of tags for a multimedia content.

In an embodiment, to simplify how a user may determine whether a tag is highly rated, graphical indicator icons are placed in proximity to the tag. For example, thumb rating icons might be shown next to tag associations based on community ratings. The display of thumb icons may correlate with the net rating of the tag. Under this circumstance, no thumbs are shown if the net rating for the tag is <=0, a single thumbs-up is shown is the net rating is greater than 0. Two thumbs-up are displayed if the net rating is greater than the number of ratings multiplied by ⅓. Three thumbs-up are displayed if the net rating of the tag is greater than the number of ratings multiplied by ⅔. In an embodiment, thumbs are displayed or may not be displayed based upon specified values of the net ratings. As opposed to the first example where thumb icons are always shown, a net rating close to zero may yield no thumbs shown. As an example, a net rating<⅙ displays no thumbs, ⅙<net rating<½ displays one thumb, ½<net rating<⅚ displays two thumbs, and ⅚<net rating displays three thumbs. Other values to determine the graphical indicator displayed may also be specified.

In another embodiment, graphical indicator icons may not be shown if the number of ratings is below a threshold value. For example, a thumb rating may be displayed only if at least five ratings are received referencing the tag. Finally, tags may also be removed based upon poor ratings. In an embodiment, a tag is removed is the net rating of the tag is less than the number of ratings multiplied by ⅓.

This community policing of tags using ratings keeps the tag associations relevant and valuable in the database. Performing the acts of thumb rating tag associations, recording the submitting user of the tag, and allowing only a single rating per user to be stored on a given association leverages the statistical intelligence of the community of users to ensure that tags are correctly applied and bad behavior is curbed. In an embodiment, a user may change the rating submitted. Under this circumstance, a user may submit a second rating for a particular tag association. A confirmation screen may appear that states that the second rating takes the place of the original rating.

In an embodiment, to assist in community policing, automated mechanisms are applied to the community rating information. In particular, tag associations with a high rating migrate to the top of the list for both tags associated with content and content associated with tag searches. In an embodiment, a tag is not displayed at all if the net rating of the tag is below a specified threshold. The threshold may vary from implementation to implementation. For example, tags might not be displayed if the net rating is more than ⅓ negative for the tag. In an embodiment, the user who submitted a tag that achieves a negative rating is flagged as a potential tagging abuser. Flagging may occur only if a minimum specified number of negative ratings are received. In addition, the reliability of the user submitting negative ratings may be given more weight if the user is rated reliable by the community.

Methods are used to curb the tagging abuser. In an embodiment, if a user receives more than N abuse flags, where N is some specified number, the user is silently banned from the tagging system. Such a ban means that the user is no longer able to suggest, associate, or rate tags. The information that the user submits is simply ignored. In an embodiment, to avoid bad feelings and customer support calls, no notification is given to the user. In an embodiment, the librarian may, at his discretion, purge all tag associations created by the banned user. In an embodiment, the librarian may, also at his, manually ban or unban any user.

3.4 ILLUSTRATIONS OF TAGS AND COMMUNITY-BASED RATINGS

Figure 6:
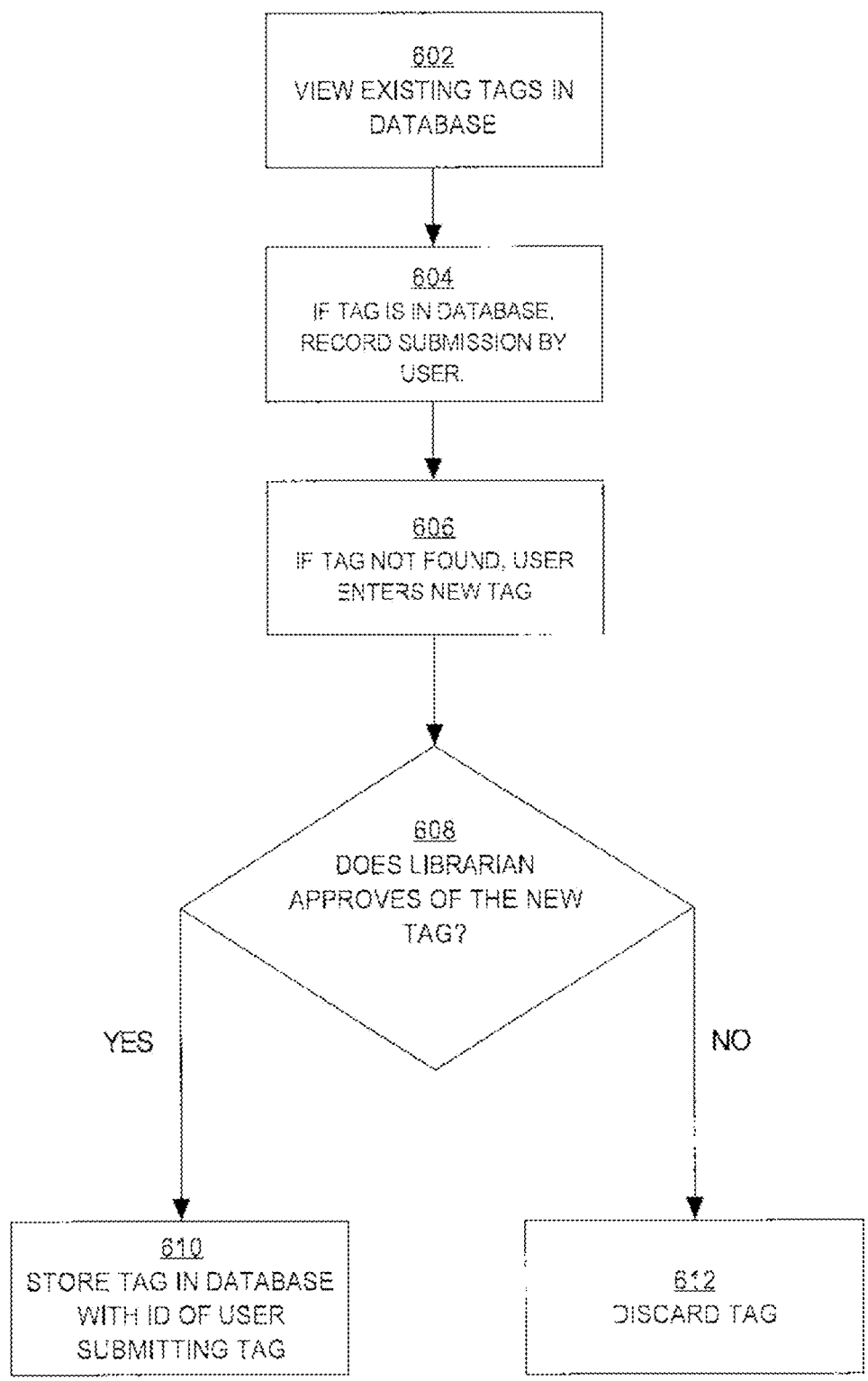
FIG. 6 is a flow diagram depicting a process for submitting tags, according to an embodiment.

Referring now to FIG. 6, a flow diagram depicting a process for creating and processing tags is shown in accordance with an embodiment. In step 602, a user or other entity using a control device wishes to enter a tag by viewing existing tags in the hierarchical tag database. If the desired tag is included in the hierarchical tag database, then the user selects the tag and the database records the request, as shown in step 604. If the desired tag is not found, the user submits a new tag for entry into the database in step 606. In step 608, a librarian approves or disapproves the submitted tag for entry into the database. In step 610, the tag is stored in the database if the tag is approved with the location in the hierarchical database determined by the librarian. In addition, the identity of the user submitting the tag is stored in association with the tag. In step 612, the tag is discarded if the librarian does not approve of the tag. If the new tag is stored, other users may view the tag in the database.

Figure 7:
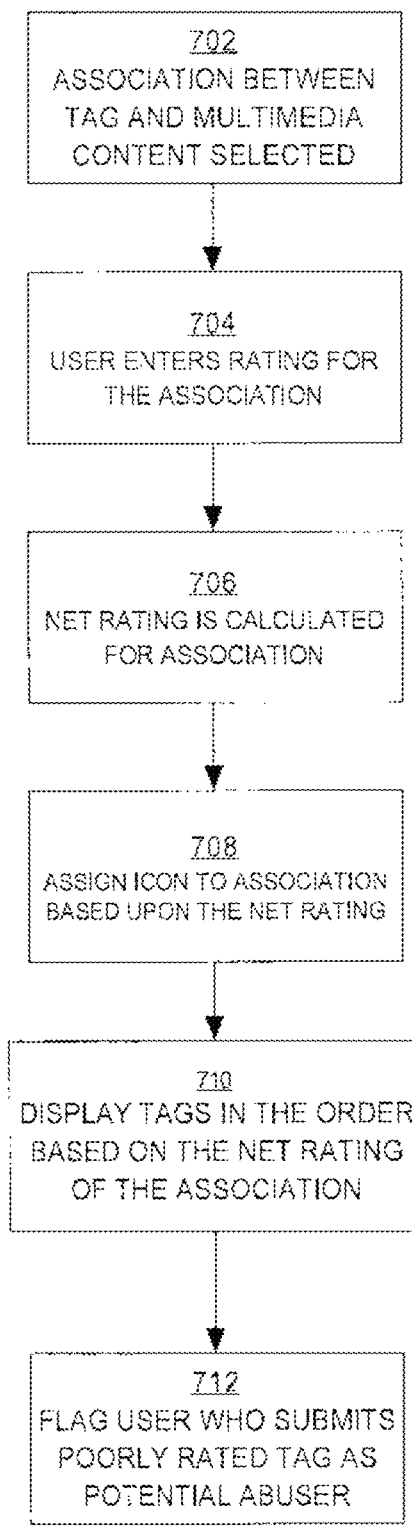
FIG. 7 is a flow diagram depicting a process for community-based raging of tags, according to an embodiment.

FIG. 7 displays a flow diagram depicting a process for processing community-based ratings according to an embodiment. In step 702, an association between a tag and a multimedia content is selected for rating by a user. Next, the user enters a rating for tag using thumbs-up for 'good' or thumbs-down for 'bad' in step 704. Users are limited to only submitting one rating per association. A net rating of the association is calculated for all ratings submitted in step 706. Icons are associated with the rating based upon the net rating in step 708. In step 710, tags are listed based at least in part to the net rating and may be removed based upon the net rating. Finally, in step 712, a user may be flagged as a tag abuser if the net rating for his submitted tag is poor. Assignment of a specified number of abuse flags may remove the user from submitting any future information.

4.0 EXAMPLE EMBODIMENTS

Additional example embodiments are set forth for illustrative purposes in the following numbered clauses.

1. A method, comprising: receiving, at a server, a plurality of candidate tags from a plurality of users indicating particular aspects of multimedia content; determining whether a particular candidate tag, of the plurality of candidate tags, reflects the particular aspects of the multimedia content; upon determining that the particular candidate tag does not reflect the aspects of the multimedia content, discarding the particular candidate tag; and upon determining that the particular candidate tag does reflect the aspects of the multimedia content, storing the particular candidate tag.
2. The method of Clause 1, wherein storing the particular tag further comprises: determining where, in a hierarchy of previously stored tags, the particular candidate tag is to be stored; and storing the particular candidate tag in the hierarchy.
3. The method of Clause 1, wherein storing the tag further comprises associating an identification of the one or more users who submitted the tag.
4. The method of Clause 1, wherein candidate tags from users are input via a remote media device.
5. The method of Clause 2, further comprising: displaying to a user, possible tags that may be submitted based upon the tags stored in the hierarchy; receiving a selection of one of the possible tags indicating particular aspects of multimedia content; and storing the selection of the tag and the associated multimedia content.
6. The method of Clause 1, further comprising: receiving ratings from users indicating a quality of a tag and the associated multimedia content; calculating a quality score based at least upon the ratings from the users; removing the tag if the quality score of the tag is below a specified threshold; and displaying the tag if the quality score of the tag is above the specified threshold.
7. The method of Clause 6, wherein tags rated highly are displayed more prominently upon a search.
8. The method of Clause 6, wherein the quality score is calculated from ratings that are weighted based upon a reliability value of the user submitting the rating.
9. The method of Clause 1, wherein tags identify a particular segment or point of a multimedia content.
10. The method of Clause 1, wherein determining where, in a hierarchy of previously stored tags, the particular candidate tag is to be stored, further comprises receiving user command input identifying one or more parent nodes to which the candidate tag is a child.
11. An apparatus, comprising: a candidate tag receiving component that receives a plurality of candidate tags from a plurality of users indicating particular aspects of multimedia content; an candidate tag analysis component that determines whether a particular candidate tag, of the plurality of candidate tags, reflects the particular aspects of the multimedia content; a candidate tag removal component that upon determining that the particular candidate tag does not reflect the aspects of the multimedia content, discards the particular candidate tag; and a candidate tag storing component that stores the particular candidate tag.

12. The apparatus of Clause 11 wherein the candidate tag storing component further comprises a candidate tag hierarchy placement component that determines where, in a hierarchy of previously stored tags, the particular candidate tag is to be stored; and the candidate tag storing component storing the particular candidate tag in the hierarchy.
13. The apparatus of Clause 11, wherein the candidate tag storing component further comprises associating an identification of the user who submitted the tag.
14. The apparatus of Clause 11, wherein candidate tags from users are input via a remote media device.
15. The apparatus of Clause 11, further comprising: a display component that displays to a user, possible tags that may be submitted based upon the tags stored in the hierarchy; a selection receiving component that receives a selection of one of the possible tags indicating particular aspects of multimedia content; and a selection tag storing component that stores the selection of the tag and the associated multimedia content.
16. The apparatus of Clause 11, further comprising: a rating receiving component that receives ratings from users indicating the quality of a tag and the associated multimedia content; a quality calculation component that calculates a quality score based at least upon the ratings from the users; a tag removal component that removes the tag if the quality score of the tag is below a specified threshold; and a display component that displays the tag if the quality score of the tag is above the specified threshold.
17. The apparatus of Clause 16, wherein tags rated highly are displayed more prominently upon a search.
18. The apparatus of Clause 16, wherein the quality score is calculated from ratings that are weighted based upon a reliability value of the user submitting the rating.
19. The apparatus of Clause 11, wherein tags identify a particular segment or point of a multimedia content.
20. The apparatus of Clause 12, further comprising a user input receiving component that receives user command input identifying one or more parent nodes to which the candidate tag is a child.

5.0 IMPLEMENTATION MECHANISMS

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
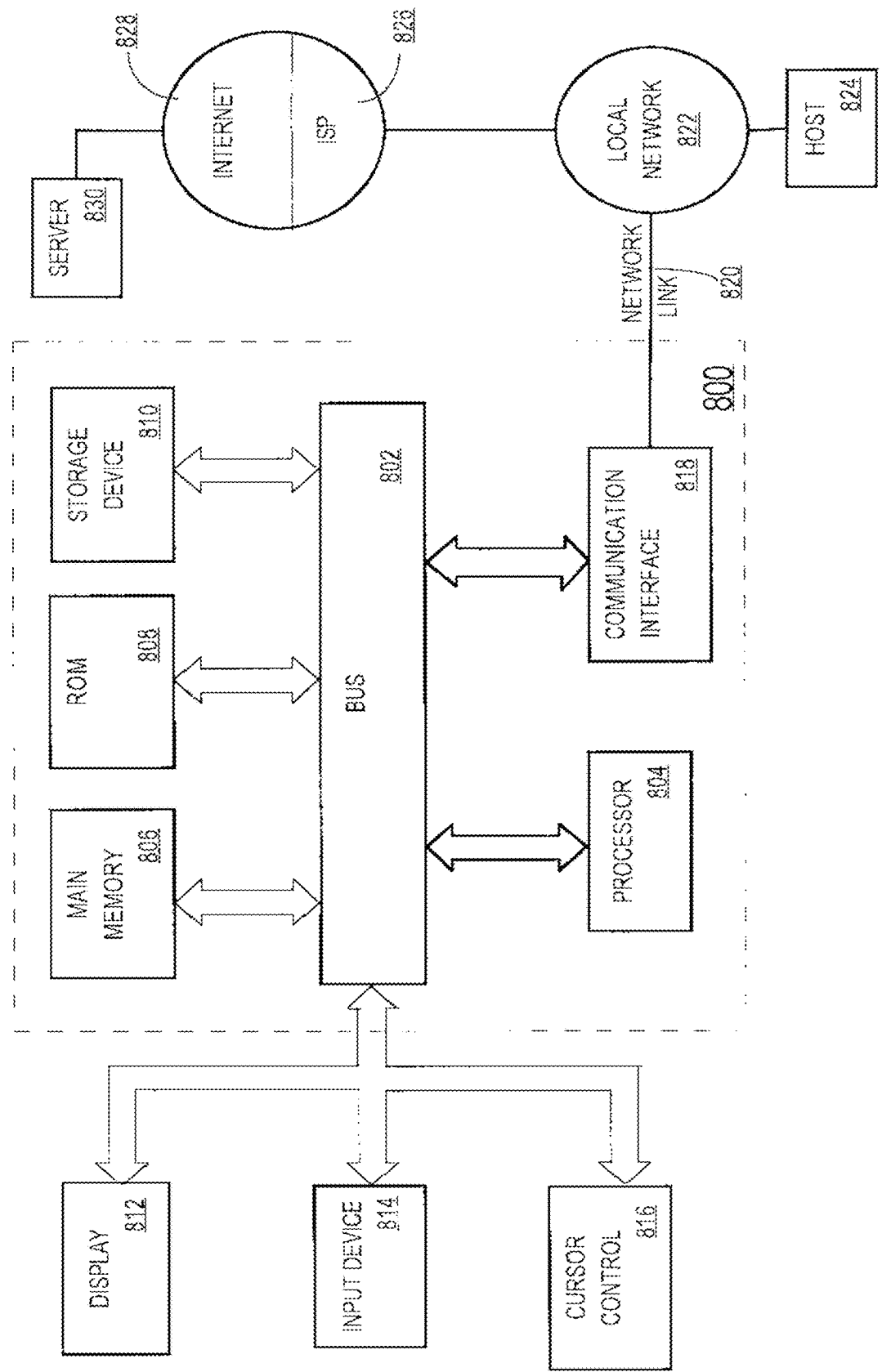
FIG. 8 is a block diagram of a system on which embodiments of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   receiving a tag associated with a media content from a device;
   determining whether the tag matches one of a plurality of tags in a database;
   responsive to the determination that the tag does not match one of the plurality of tags in the database:
      determining, by an automated approval process, whether the tag is granted approval;
      responsive to the determination that the tag is granted approval:
         updating the plurality of tags in the database by adding the tag to the database; and
   transmitting the plurality of tags from the database to the device or another device for selection of at least one of the plurality of tags.

2. The method of claim 1, further comprising:
   determining a location, in a hierarchy of previously stored tags, for the tag to be stored;
   storing the tag in the hierarchy at the determined location; and
   providing the plurality of tags to the device or the another device in accordance with the hierarchy.

3. The method of claim 2, further comprising:
   transmitting one or more lists of possible tags that may be submitted based upon tags stored in the hierarchy;
   receiving a selection of one of the possible tags in association with the particular item of media content; and
   storing the selection of the tag in association with the particular item of media content.

4. The method of claim 2, wherein determining where, in the hierarchy of previously stored tags, the tag is to be stored further comprises receiving, at the server, with the tag, user command input identifying one or more parent nodes to which the tag is a child.

5. The method of claim 1, wherein updating the plurality of tags in the database by adding the tag to the database further comprises associating the tag with an identification of one or more users who submitted the tag.

6. The method of claim 1, further comprising receiving the plurality of tags from remote media devices that display user interfaces.

7. The method of claim 1, further comprising:
   receiving ratings from users indicating a quality of associations between tags in the plurality of tags and associated items of media content;
   calculating quality scores for the associations based at least upon the ratings from the users; and
   removing the association of the tag and the media content if a quality score calculated for the association is below a specified threshold.

8. The method of claim 7, further comprising providing data that causes user interfaces to display tags whose associations are rated highly more prominently than tags whose associations are rated lowly.

9. The method of claim 1, further comprising:
   calculating quality scores for tags in the plurality of tags, based at least in part on tag ratings for the tags that are weighted based upon reliability values of users submitting the tag ratings; and ordering the plurality of tags based on the quality scores.

10. The method of claim 9, wherein ordering the plurality of tags comprises determining a particular order for the plurality of tags relative to a particular item, wherein the ratings are relative to the particular item.

11. A system, comprising:
control circuitry configured to:
receive a tag associated with a media content from a device;
determine whether the tag matches one of a plurality of tags in a database;
responsive to the determination that the tag does not match one of the plurality of tags in the database:
determine, by an automated approval process, whether the tag is granted approval;
responsive to the determination that the tag is granted approval:
update the plurality of tags in the database by adding the tag to the database; and
transmit the plurality of tags from the database to the device or another device for selection of at least one of the plurality of tags.

12. The system of claim 11, wherein the control circuitry is further configured to:
determine a location, in a hierarchy of previously stored tags, for the tag to be stored;
store the tag in the hierarchy at the determined location; and
provide the plurality of tags to the device or the another device in accordance with the hierarchy.

13. The system of claim 12, wherein the control circuitry is further configured to:
transmit one or more lists of possible tags that may be submitted based upon tags stored in the hierarchy;
receive a selection of one of the possible tags in association with the particular item of media content; and
store the selection of the tag in association with the particular item of media content.

14. The system of claim 12, wherein determining where, in the hierarchy of previously stored tags, the tag is to be stored further comprises receiving, at the server, with the tag, user command input identifying one or more parent nodes to which the tag is a child.

15. The system of claim 11, wherein the control circuitry is further configured, when updating the plurality of tags in the database by adding the tag to the database, to associate the tag with an identification of one or more users who submitted the tag.

16. The system of claim 11, wherein the control circuitry is further configured to receive the plurality of tags from remote media devices that display user interfaces.

17. The system of claim 11, wherein the control circuitry is further configured to:
receive ratings from users indicating a quality of associations between tags in the plurality of tags and associated items of media content;
calculate quality scores for the associations based at least upon the ratings from the users; and
remove the association of the tag and the media content if a quality score calculated for the association is below a specified threshold.

18. The system of claim 17, wherein the control circuitry is further configured to provide data that causes user interfaces to display tags whose associations are rated highly more prominently than tags whose associations are rated lowly.

19. The system of claim 11, wherein the control circuitry is further configured to:
calculate quality scores for tags in the plurality of tags, based at least in part on tag ratings for the tags that are weighted based upon reliability values of users submitting the tag ratings; and
order the plurality of tags based on the quality scores.

20. The system of claim 19, wherein the control circuitry is further configured, when ordering the set of tags, to determine a particular order for the plurality of tags relative to a particular item, wherein the ratings are relative to the particular item.

* * * * *